(12) United States Patent
Fujita

(10) Patent No.: US 6,563,248 B2
(45) Date of Patent: May 13, 2003

(54) HYBRID-MAGNET DC MOTOR

(75) Inventor: Kazuhiro Fujita, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/025,498

(22) Filed: Dec. 26, 2001

(65) Prior Publication Data

US 2002/0084714 A1 Jul. 4, 2002

(30) Foreign Application Priority Data

Dec. 28, 2000 (JP) ............................... 2000-399769

(51) Int. Cl.⁷ ..................... H02K 23/02; H02K 23/04
(52) U.S. Cl. ................... 310/181; 310/154.02
(58) Field of Search ........................ 370/181, 179, 370/180, 152, 154.01, 154.02, 154.08, 154.09, 154.34, 154.49, 216, 254, 256, 258, 259; 322/46; 335/220, 229, 136, 137, 153, 159, 205, 207, 222, 302, 304, 306, 278

(56) References Cited

U.S. PATENT DOCUMENTS

| | | | | |
|---|---|---|---|---|
| 2,553,298 A | * | 5/1951 | Brunelle et al. | 310/154.02 |
| 2,993,134 A | * | 7/1961 | Harvey | 310/154.47 |
| 3,624,574 A | * | 11/1971 | Montagu | 335/210 |
| 3,984,711 A | * | 10/1976 | Kordik | 310/49 R |
| 5,647,321 A | * | 7/1997 | Ichikawa et al. | 123/399 |
| 5,825,113 A | * | 10/1998 | Lipo et al. | 310/181 |
| 6,051,904 A | | 4/2000 | Akemakou | 310/171 |
| 6,242,834 B1 | * | 6/2001 | Akemakou | 310/162 |
| 6,342,746 B1 | * | 1/2002 | Flynn | 310/181 |

FOREIGN PATENT DOCUMENTS

| | | | |
|---|---|---|---|
| JP | A-2-266859 | | 10/1990 |
| JP | A-2000-150228 | | 5/2000 |
| JP | 2002-247824 | * | 8/2002 |

* cited by examiner

*Primary Examiner*—Dang Dinh Le
(74) *Attorney, Agent, or Firm*—Posz & Bethards, PLC

(57) ABSTRACT

Electromagnets are placed to face each other in a yoke. Both ends of pole cores of the electromagnets are extended and bent. Permanent magnets are sandwiched between the extended parts of the pole cores. The north pole and south pole of the permanent magnet are in abutment with the north pole core and south pole core, respectively. When rotor windings and stator windings are not energized, a flux of the permanent magnets forms a closed magnetic circuit within the stator. When the rotor windings and the stator windings are energized, magnetic force lines of the electromagnets and permanent magnets flow through an armature core in the same direction via teeth and fluxes are increased.

8 Claims, 3 Drawing Sheets

HYBRID-MAGNET DC MOTOR

CROSS REFERENCE TO RELATED APPLICATION

This application is based on and incorporates herein by reference Japanese Patent Application No. 2000-399769 filed Dec. 28, 2000.

BACKGROUND OF THE INVENTION

The present invention relates to a hybrid-magnet DC motor comprising stator windings and permanent magnets as part of a stator.

A small motor with high torque and low power consumption utilizing permanent magnets is widely used in various fields such as automobile, OA equipment, vending machine, and medical and welfare equipment.

In JP-A-2000-150228, it is proposed to construct a stepping motor utilizing a hybrid-magnet which comprises an electromagnet and a permanent magnet. This motor has a core with its ends bent at right angle for directing a flux of the exciting coil of the electromagnet to a stator. However, bending a path of flux reduces efficiency of the motor as efficiency of the flux is reduced.

SUMMARY OF THE INVENTION

The present invention therefore has an objective to provide a hybrid-magnet DC motor that produces high torque and low cogging torque in starting the motor. This is accomplished by effectively utilizing fluxes of electromagnets and permanent magnets in the hybrid-magnet.

According to the present invention, a hybrid-magnet DC motor comprises a cylindrical yoke, a stator including a plurality of electromagnets and permanent magnets, and a rotor including an armature. The electromagnets are placed in the yoke in a manner that opposite polarities alternately appear in a circumferential direction of the yoke. The permanent magnets are sandwiched between stator cores as their mating surfaces have the same polarities. An armature core having a plurality of pole teeth is integrated to a rotor shaft so that it rotates with a rotor shaft.

When the electromagnets and the armature are not energized, a flux of the permanent magnet forms a closed magnetic circuit within the stator. When the electromagnets and the armature are energized, fluxes of the permanent magnet and the electromagnets flow through the armature core in the same direction via the pole teeth forming closed magnetic circuits.

When the electromagnets and the armature are not energized, the cogging torque at the start of the motor is approximately zero since the fluxes of the permanent magnets form closed magnetic circuits within the stator, namely, do not flow through the armature core. On the other hand, when the electromagnets and armature are energized, strong fluxes, the sum of electromagnet flux and permanent magnet flux, are generated and high torque is produced in starting the motor.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to various embodiments.

[First Embodiment]

Figure 1:
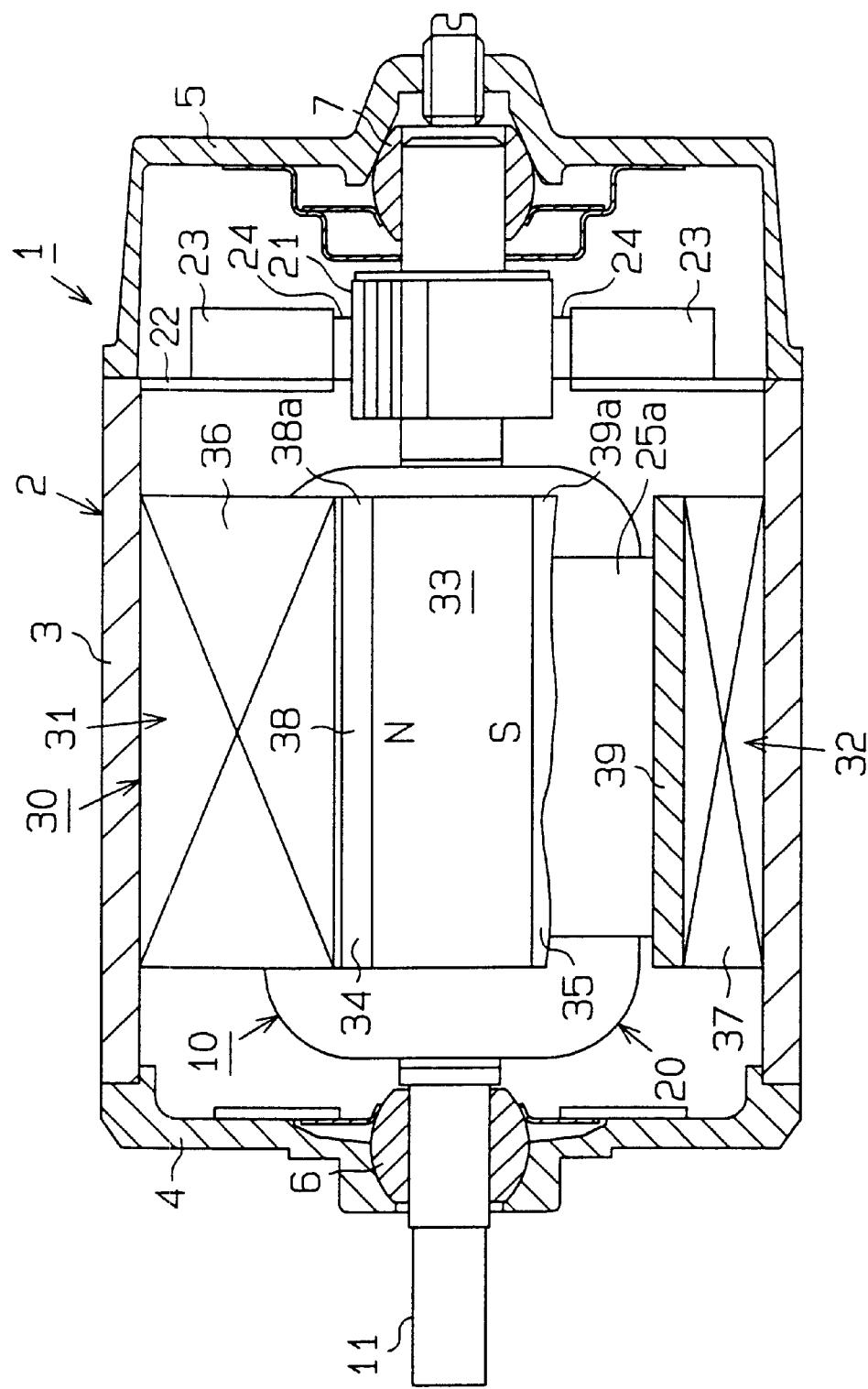
FIG. 1 is a sectional view of a hybrid-magnet DC motor according to one embodiment of the present invention.

Referring to FIG. 1, a DC motor 1 has a motor housing 2, which comprises a cylindrical yoke 3 and end frames 4 and 5. The end frames 4 and 5 have bearings 6 and 7 at the center of each frame, respectively. A rotor 10 is placed in a space surrounded by the yoke 3 and the end frames 4 and 5. A rotor shaft 11 is supported by the bearings 6 and 7 with its one end penetrating the end frame 4 through a hole.

The motor 1 is a brush-type DC motor. The rotor 10 comprises an armature 20 and a commutator 21. The commutator 21 is placed inside the end frame 5. An annular shaped plate 22 is installed so that it divides inside space of the yoke 3 and the end frame 5 at their connecting point. The plate 22 supports brush holders 23. Brushes 24 held by the brush holders 23 sandwich the commutator 21 between them. A DC current is supplied to the brushes 24. The commutator 21, brush holders 23, and brushes 24 form a commutating unit.

Figure 2:
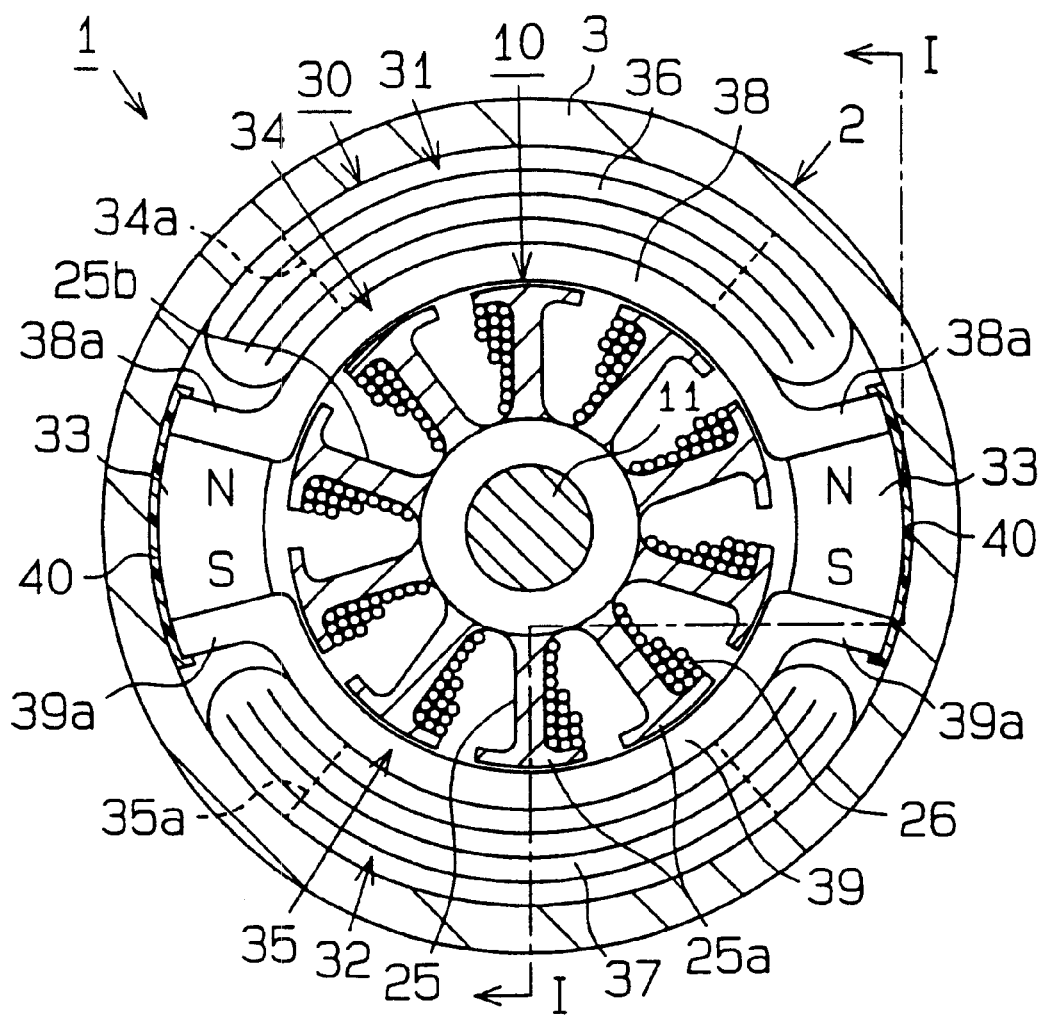
FIG. 2 is another sectional view of the hybrid-magnet DC motor shown in FIG. 1.

As shown in FIG. 2, a generally annular-shaped stator 30 is fixed to the inner periphery of the yoke 3. The stator 30 is placed to face the outer periphery of the armature 20 with a clearance. The stator 30 is configured as a hybrid-magnet comprising electromagnets 31 and 32, and permanent magnets 33. The electromagnets 31 and 32 comprise stator cores 34 and 35 with stator windings 36 and 37.

The armature 20 comprises an armature core 25 and rotor windings 26. The core 25 has a plurality of teeth 25a extending out from its center at the same angles. Slots 25b are spaces between adjacent teeth 25a. The windings 26 are placed in the slots 25b as they are wound around each tooth 25a. A DC current is supplied to the windings 26 via brushes 24.

The stator 30 has a pair of electromagnets 31 sandwiching the armature 20 between them. Stator cores 34 and 35 of the electromagnets 31 comprise pole cores 38 and 39. The pole core 38 and 39 are placed to face the teeth 25a with a clearance. The stator cores 34 and 35 have protrusions 34a and 35a fixed to the outer rim of the pole cores 38 and 39 extending outward in the radial direction. The stator windings 36 and 37 are wound around the protrusions 34a and 35a.

The angle formed by both sides of the permanent magnet 33 and the center of the motor 1 is set to lie less than 360°/T (T=Number of teeth). In this embodiment, the number of teeth is 10 (T=10), and the angle is 36°.

DC currents are supplied to the stator windings 36 and 37. When a driving switch of the DC motor 1 is turned on, DC currents are supplied to rotor windings 26, and stator windings 36 and 37. The stator windings 36 and 37 are wound so that the pole cores 38 and 39 are magnetized in opposite polarities. When the stator windings 36 and 37 are energized, the pole core 38 is magnetized to the north pole (N), and the pole core 39 is magnetized to the south pole (S).

Both ends of the pole cores 38 and 39 are extended in the circumferential direction. The extended parts 38a and 39a of the pole cores 38 and 39 are in the form of a plate, and extend in the radically outward direction at the circumferential ends.

The permanent magnets 33 are sandwiched between the extended parts 38a and 39a. The north pole (N) of the magnet 33 has contact with the extended part 38a, and the south pole (S) has contact with the extended part 39a. A north-south direction of the permanent magnet 33 generally matches the circumferential direction of the motor 1.

Insulation 40 made of a resin plate is interposed between outer surface of the permanent magnets 33 and its extended parts 38a and 39a and inner wall of the yoke 3, providing magnetic isolation between them. This ensures a flux of the permanent magnets 33 to pass through each tooth 25a and arc parts of the pole cores 38 and 39.

A winding direction of the rotor windings 26 is determined so that about half of the teeth 25a on the left side in FIG. 2 are magnetized to the north pole, and about half on the right side are magnetized to the south pole. In FIG. 2, the rotor 10 starts rotating clockwise when the DC motor 1 is in motion.

Figure 3A:
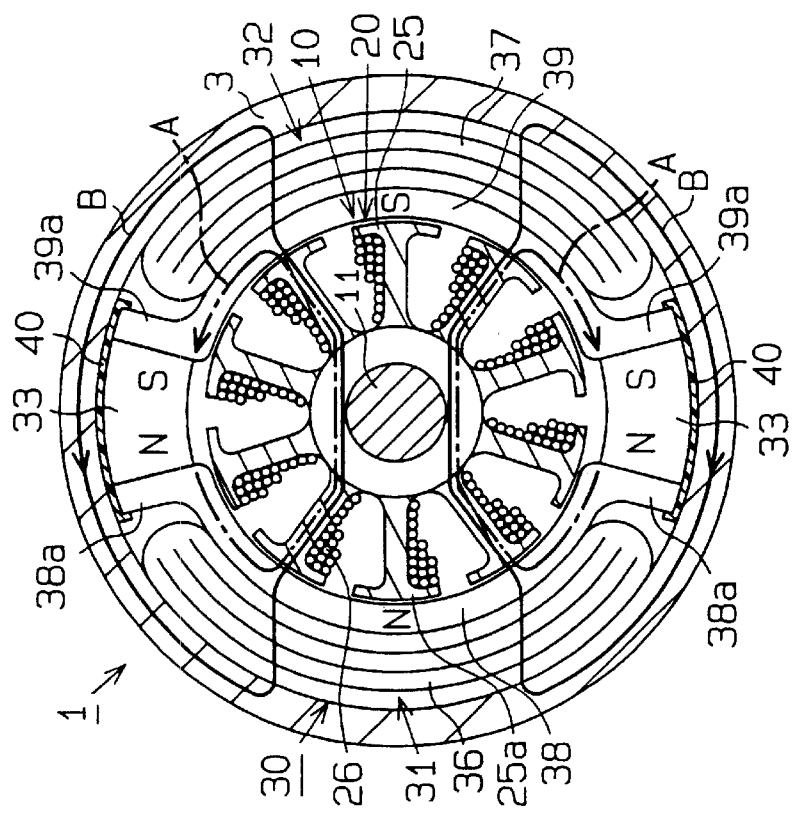
FIGS. 3A and 3B are sectional views of the hybrid-magnet DC motor at rest and in motion, respectively.

When the motor 1 is not in motion, DC currents do not flow in the rotor windings 26 nor stator windings 36 and 37. As shown in FIG. 3A, when an exciting current of the rotor windings 26 and stator windings 36 and 37 is zero, a magnetic force line A in the permanent magnet 33 forms a closed magnetic circuit within the stator 30. This is indicated in solid line in FIG. 3A. Therefore, cogging torque becomes zero assuming that no leak flux exists, which means cogging torque at the start of the motor hardly occurs.

Figure 3B:
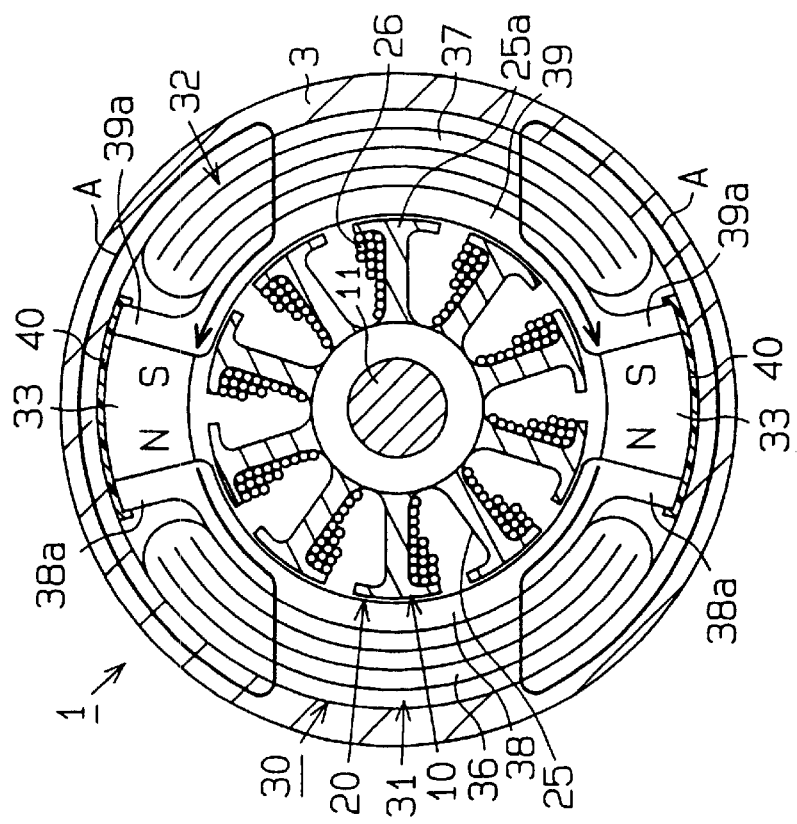

When the DC motor 1 is in motion, DC currents flow in the rotor windings 26 via brushes 24 and the commutator 21 as well as in the stator windings 36 and 37. The current flowing in the rotor windings 26 switches its direction in synchronization with a rotation of the rotor 10. As shown in FIG. 3B, the teeth 25a in the upper half portion are magnetized to the north pole (N), and the ones in the lower half portion are magnetized to the south pole (S). The pole core 38 is magnetized to the north pole (N), and the pole core 39 is magnetized to the south pole (S).

The teeth 25a that are magnetized to the north pole have repulsion from the pole core 38, and attraction from the pole core 39. The teeth 25a that are magnetized to the south pole have repulsion from the pole core 39, and attraction from the pole core 38. As a result, clockwise force is applied to the rotor 10, and the rotor 10 starts rotating.

As shown in FIG. 3B, a magnetic force line B generated by the stator windings 36 and 37 forms a closed magnetic circuit indicated in a solid line. The magnetic force line A is pulled into the rotor 10 via the teeth 25a from the pole cores 38 and 39 due to a pulling effect of the magnetic force line. As a result, the direction of the lines A and B becomes equal, as indicated by a dashed line. Magnetic lines of force flowing between the stator 30 and the armature 20 are increased by constructive interference of the lines A and B. Therefore, the rotor 10 rotates with a large driving torque.

Since the north-south direction of the permanent magnet 33 matches with the circumferential direction of the motor, polarities of the lines of force smoothly shift between the electromagnets 31 and 32. Assuming that the permanent magnet 33 is not provided, a plurality of magnetic force lines with opposite polarities generated by the stator windings 36 and 37 concentrates between the electromagnets 31 and 32 in a circumferential direction. Therefore, a gap due to the different polarities of the magnetic force lines in the circumferential direction of the DC motor is created. By providing the permanent magnets 33 between the electromagnets 31 and 32 as in FIG. 2, the polarity shifting becomes smooth. As a result, the cogging torque in starting the motor 1 is less likely to occur.

Since the pole cores 38 and 39 are curved, the distance between the pole cores 38 and 39 become closer at the both ends. Therefore, fluxes generated by the pole cores 38 and 39 are more likely to pass through gaps without flowing though the teeth 25a. However, in this embodiment, the north pole and south pole electromagnets 31 and 32 have contact with the north pole and south pole of the permanent magnets 33, respectively. Therefore, fluxes of the electromagnets 31 and 32 cannot pass through the gaps because they flow against fluxes of the permanent magnets 33. Moreover, the fluxes flowing to the teeth 25a increase because the fluxes of the permanent magnets 33 flow along the fluxes of the electromagnets 31 and 32.

[Other Embodiment]

The above embodiment may be modified and altered as follows.

The extended parts 38a and 39a of the pole cores 38 and 39 need not to be provided. For example, reasonably thick arc-shaped plates can be used for pole cores 38 and 39 and hold the permanent magnet with the plates.

The hybrid-magnet DC motor should not be limited to an inner rotor-type. It can be an outer-rotor type. The shape and number of the teeth can be altered as necessary.

The north-south direction of the permanent magnets 33 can be placed in the radial direction of the DC motor 1. In this case, one of the extended parts 38a and 39a of the pole core 38, 39 is bent inward and the other one is bent outward so that they have contact with proper side of the permanent magnet 33. With this configuration, the same effect can be obtained as in the case of the north-south direction of the permanent magnets in the circumferential direction of the DC motor 1.

The number of electromagnets 31 and 32 in the stator 30 are not limited to two as long as they are an even number so that north and south poles alternately appear in a circumferential direction.

Magnetic insulation between pole cores 38 and 39 and the yoke 3 as well as permanent magnets 33 and the yoke 3 can be provided by space rather than by insulators as long as the space is sufficient for magnetic isolation.

According to the embodiments, the following effects are provided:

Strong fluxes, the sum of electromagnet flux and permanent magnet flux, are generated. This is because permanent magnets 33 are placed in abutment with stator cores 34 and 35 in a manner that fluxes of the magnets 33 are in the same direction as fluxes of electromagnets 31 and 32. Moreover, the stator cores 34 and 35 are not bent in order to direct the flux of the electromagnets 31 and 32 to the armature 20. Therefore, the flux generated by the stator cores 34 and 35 is effectively utilized.

The north and south poles of the permanent magnet 33 are in abutment with the extended parts 38a and 39a, respectively. Therefore, magnetic fields generated by the electromagnets 31 and 32 and the permanent magnets 33 have the same polarity in the extended parts 38a and 39a. As a result, the flux is intensified, and the flux of the permanent magnet 33 flows to pole cores 38 and 39 rather than the yoke 3.

The permanent magnets 33 are placed so that their north and south direction matches the circumferential direction of the DC motor 1. Therefore, the flux of the permanent magnets 33 is generated in the circumferential direction of the DC motor 1. This enables a smooth shift of magnetic force lines from the north pole to the south pole between a plurality of electromagnets 31 and 32. As a result, cogging torque is reduced.

The permanent magnets 33 are sandwiched between the extended parts 38a and 39a of the pole cores 38 and 39. Their contact areas are expanded by making the extended parts 38a and 39a in a plate shape. Therefore, stronger flux is generated because they have contact with high flux density areas of the permanent magnets 33. As a result, high torque is provided at a start of the DC motor 1.

What is claimed is:

1. A hybrid-magnet DC motor, comprising:

a cylindrical yoke;

a stator including a plurality of electromagnets placed in the yoke and magnetizable in opposite magnetic polarities alternately in a circumferential direction, and a plurality of permanent magnets sandwiched between stator cores of the electromagnets and magnetized in same magnetic polarities as those of the stator cores adjacent thereto; and a rotor including an armature having a plurality of teeth around an armature core mounted on a rotor shaft, wherein fluxes of the permanent magnets form a closed magnetic circuit within the stator when the electromagnets and the armature are deenergized, and wherein fluxes of the permanent magnets and the electromagnets flow through the armature core in a same direction via the teeth when the electromagnets and the armature are energized.

2. A hybrid-magnet DC motor, comprising:

an armature including an armature core having teeth and rotor windings which generates magnetic fields that produce rotating power;

a hybrid-magnet including a plurality of electromagnets, stator cores and a plurality of permanent magnets, the electromagnets being placed to generate magnetic fields in opposite polarities alternately in a circumferential direction, the stator cores having pole cores placed close to the armature core and stator windings wound around the stator cores with their inner rims facing the armature, and the permanent magnets being placed between the electromagnets and having north and south poles in contact with a north pole and a south pole of the electromagnets, respectively; and a magnetic permeable stator yoke placed magnetically isolated from the permanent magnets and connected to ends of the stator cores.

3. A hybrid-magnet DC motor as in claim 2, wherein:

each pole core has extended parts; and the permanent magnet is sandwiched between the extended parts.

4. A hybrid-magnet DC motor as in claim 2, wherein the permanent magnets are placed so that a north-south direction thereof matches a rotating direction of the armature.

5. A hybrid-magnet DC motor as in claim 4, wherein:

the extended parts of the pole cores are in the form of a plate;

a circumferential end of each part is bent in a radial direction; and the permanent magnets are sandwiched between the circumferential ends of the extended parts.

6. A hybrid-magnet DC motor as in claim 2, wherein a circumferential size of the permanent magnets facing the rotor core is no more than 360/T degrees, where T is a number of the teeth of the rotor core.

7. A hybrid-magnet DC motor as in claim 2, wherein magnetic insulation is provided by insulator between the electromagnets and the yoke.

8. A hybrid-magnet DC motor, comprising:

an armature including an armature core having teeth and rotor windings which generates magnetic fields that produce rotating power; and a hybrid-magnet including a plurality of electromagnets, stator cores, and a plurality of permanent magnets, the electromagnets being placed to generate magnetic fields so that magnetic force lines pass the armature in opposite polarities alternately in a circumferential direction, the stator cores having pole cores placed close to the armature core and curved along a periphery of the armature, stator windings wound around the stator cores with their inner rims facing the armature, wherein north and south poles of permanent magnets are placed in contact with a north pole and a south pole of the electromagnets, respectively, and alternately in a circumferential direction, wherein fluxes of the permanent magnets form a closed magnetic circuit within the stator when the electromagnets and the armature are deenergized, and wherein fluxes of the permanent magnets and the electromagnets flow through the armature core in a same direction via the teeth when the electromagnets and the armature are energized.

* * * * *